US011807181B2

(12) United States Patent
Druker et al.

(10) Patent No.: US 11,807,181 B2
(45) Date of Patent: Nov. 7, 2023

(54) VISION-BASED AIRBAG ENABLEMENT

(71) Applicant: GM GLOBAL TECHNOLOGY OPERATIONS LLC, Detroit, MI (US)

(72) Inventors: Itai Druker, Rosh Haayin (IL); Gila Kamhi, Zichron Yaakov (IL); Michael Baltaxe, Ra'anana (IL); Kobi Nistel, Zoran (IL); Ruben Mergui, Ramat-Gan (IL); Dorel M. Sala, Troy, MI (US); Lisa A. Fallon, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 469 days.

(21) Appl. No.: 17/081,428

(22) Filed: Oct. 27, 2020

(65) Prior Publication Data
US 2022/0126772 A1   Apr. 28, 2022

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2019.01) |

(Continued)

(52) U.S. Cl.
CPC .. *B60R 21/01538* (2014.10); *B60R 21/01516* (2014.10); *B60R 21/16* (2013.01); *G06T 7/194* (2017.01); *G06T 7/70* (2017.01); *B60R 2021/161* (2013.01); *G06T 2207/20081* (2013.01); *G06T 2207/20084* (2013.01); *G06T 2207/30268* (2013.01)

(58) Field of Classification Search
CPC ........ B60R 21/01538; B60R 21/01516; B60R 21/16; B60R 2021/161; B60R 21/01552; B60R 21/2338; B60R 2021/01211; G06T 7/194; G06T 7/70; G06T 2207/20081; G06T 2207/20084; G06T 2207/30268; G06T 2207/30196; G06T 7/11; G06T 7/75
See application file for complete search history.

(56) References Cited

U.S. PATENT DOCUMENTS

| | | | | |
|---|---|---|---|---|
| 6,116,640 A | * | 9/2000 | Tanaka ...................... | G06T 7/74 |
| | | | | 701/46 |
| 10,643,085 B1 | * | 5/2020 | Kim .......................... | G06T 7/60 |

(Continued)

FOREIGN PATENT DOCUMENTS

| | | |
|---|---|---|
| DE | 102018206777 A1 | 11/2019 |
| DE | 102018214445 A1 | 1/2020 |

(Continued)

OTHER PUBLICATIONS

German Office Action for German Application No. 10 2021 112 630 4; dated Jun. 29, 2022 (pp. 1-6).

(Continued)

*Primary Examiner* — Harry Y Oh
(74) *Attorney, Agent, or Firm* — CANTOR COLBURN LLP

(57) ABSTRACT

Vision-based airbag enablement may include capturing two-dimensional images of a passenger, segmenting the image, classifying the image, and determining seated height of the passenger from the image. Enabling or disabling deployment of the airbag may be controlled based at least in part upon the determined seated height.

18 Claims, 2 Drawing Sheets

(51) Int. Cl.
*B60R 21/015* (2006.01)
*B60R 21/16* (2006.01)
*G06T 7/194* (2017.01)
*G06T 7/70* (2017.01)

(56) References Cited

U.S. PATENT DOCUMENTS

| | | | |
|---|---|---|---|
| 2006/0280336 A1 | 12/2006 | Lee | |
| 2009/0066065 A1* | 3/2009 | Breed | B60R 21/0152 340/573.1 |
| 2011/0295466 A1* | 12/2011 | Ostu | B60R 21/01534 374/45 |
| 2012/0018989 A1* | 1/2012 | Breed | B60R 21/01516 280/735 |
| 2017/0129437 A1* | 5/2017 | Chen | B60R 21/01552 |
| 2017/0210357 A1* | 7/2017 | Nagai | G06V 20/597 |
| 2019/0318181 A1* | 10/2019 | Katz | G06F 3/012 |
| 2019/0359169 A1 | 11/2019 | Schutera et al. | |
| 2020/0282867 A1* | 9/2020 | Yi | G06N 3/02 |
| 2021/0084212 A1* | 3/2021 | Tamura | B60R 21/01534 |
| 2021/0402942 A1* | 12/2021 | Torabi | B60W 50/14 |
| 2022/0114817 A1* | 4/2022 | Gronau | G06V 10/454 |
| 2022/0292705 A1* | 9/2022 | Friedman | G06V 10/82 |

FOREIGN PATENT DOCUMENTS

| | | |
|---|---|---|
| DE | 102018212877 A1 | 2/2020 |
| FR | 3079652 A1 | 10/2019 |

OTHER PUBLICATIONS

Chinese Office action for Chinese Application No. 202110504103.1; Report dated May 31, 2023; with machine translation (14 Pages).

* cited by examiner

VISION-BASED AIRBAG ENABLEMENT

INTRODUCTION

This disclosure is related to automotive supplemental passenger restraint systems. More particularly, it relates to passenger detection and passenger attribute determination for use in control of such systems.

Inflatable restraint systems (e.g. airbags) are found in passenger vehicles. Deployment of airbags may desirably be suppressed for certain passengers. For example, airbag deployment may not be desirable for young child passengers. Airbag suppression is also desirable when a passenger seating area is occupied by a rear facing child restraint system (CRS). Certain manual lock-outs and weight sensing technologies may be used to reduce the risk of airbag deployment when the seating area is occupied in such manners.

SUMMARY

In one exemplary embodiment, an apparatus may include a camera providing a two-dimensional image of a seating area of a vehicle and a controller having a height attribute model for determining a seated height of a seated passenger in the seating area of the vehicle appearing in the two-dimensional image. The height attribute model may be trained on three-dimensional skeletons corresponding to a training database of segmented two-dimensional training images. The apparatus may further include a controller enabling deployment of an airbag based upon the determined seated height of the seated passenger.

In addition to one or more of the features described herein, the segmented two-dimensional training images may be subjected to a two-dimensional skeleton extraction to produce two-dimensional skeletons projected upon three-dimensional training images corresponding to the segmented two-dimensional training images to produce the three-dimensional skeletons.

In addition to one or more of the features described herein, the apparatus may further include a seat weight sensor providing a sensed weight of the seated passenger, wherein the height attribute module may further include fusion of the sensed weight of the seated passenger.

In addition to one or more of the features described herein, the controller may further include a pose model for determining a pose of the seated passenger in the seating area of the vehicle appearing in the two-dimensional image, wherein the pose model may be trained on the segmented two-dimensional training images from the training database.

In addition to one or more of the features described herein, the controller may further include a segmentation model performing background segmentation of the two-dimensional images to provide segmented two-dimensional images to the height attribute model, wherein the segmentation model may be trained on the segmented two-dimensional training images from the training database, and wherein the segmented two-dimensional training images may be produced based upon pairs of simultaneously captured two-dimensional and three-dimensional training images.

In addition to one or more of the features described herein, the controller may further include a segmentation model performing background segmentation of the two-dimensional images to provide segmented two-dimensional images to the height attribute model and the pose model, wherein the segmentation model may be trained on the segmented two-dimensional training images from the training database, and wherein the segmented two-dimensional training images may be produced based upon pairs of simultaneously captured two-dimensional and three-dimensional training images.

In addition to one or more of the features described herein, the controller enabling deployment of an airbag based upon the determined seated height of the seated passenger may further enable deployment of the airbag based upon the seated passenger weight.

In another exemplary embodiment, an apparatus may include a camera providing a two-dimensional image of a seating area of a vehicle, a seat weight sensor providing a sensed weight on a seat in the seating area, and a controller. The controller may include a segmentation model performing background segmentation of the two-dimensional image to provide a segmented two-dimensional image of a seated passenger in the seating area of the vehicle appearing in the two-dimensional image, a pose model determining a pose of the seated passenger in the seating area of the vehicle based upon the segmented two-dimensional image, a height and weight attribute model determining a seated height and weight of the seated passenger in the seating area of the vehicle based upon the segmented two-dimensional image and the sensed weight of the seated passenger, and a controller enabling deployment of an airbag based upon the determined seated height and weight of the seated passenger.

In addition to one or more of the features described herein, each of the segmentation model, the pose model and the height and weight attribute model may include an offline trained machine learning model.

In addition to one or more of the features described herein, the machine learning models may include neural networks.

In addition to one or more of the features described herein, the segmentation model may include a neural network trained on a training database of segmented two-dimensional training images, wherein the segmented two-dimensional training images are produced based upon pairs of simultaneously captured two-dimensional and three-dimensional training images.

In addition to one or more of the features described herein, the pose model may include a neural network trained on a training database of segmented two-dimensional training images, wherein the segmented two-dimensional training images are produced based upon pairs of simultaneously captured two-dimensional and three-dimensional training images.

In addition to one or more of the features described herein, the height and weight attribute model may include a neural network trained on three-dimensional skeletons corresponding to a training database of segmented two-dimensional training images, wherein the segmented two-dimensional training images are produced based upon pairs of simultaneously captured two-dimensional and three-dimensional training images.

In addition to one or more of the features described herein, the segmented two-dimensional training images may be subjected to a two-dimensional skeleton extraction to produce two-dimensional skeletons projected upon three-dimensional training images corresponding to the segmented two-dimensional training images to produce the three-dimensional skeletons.

In yet another exemplary embodiment, a method may include: capturing a two-dimensional image of a seating area of a vehicle; segmenting, with a segmentation model, the two-dimensional image to provide a segmented two-dimensional image; classifying, with a pose model, the segmented two-dimensional image as one of a passenger with an acceptable pose and not a passenger with an acceptable pose; determining, with a height attribute model, a seated height of the passenger with an acceptable pose based upon the segmented two-dimensional image; and enabling deployment of an airbag based at least in part upon the determined seated height of the passenger with an acceptable pose meeting predetermined height requirements.

In addition to one or more of the features described herein, the method may further include disabling deployment of the airbag based at least in part upon the determined seated height of the passenger with an acceptable pose failing predetermined height requirements.

In addition to one or more of the features described herein, the method may further include disabling deployment of the airbag based upon the segmented two-dimensional image classifying as not a passenger with an acceptable pose.

In addition to one or more of the features described herein, the method may further include sensing weight on a seat in the seating area, wherein enabling deployment of the airbag is further based at least in part upon the sensed weight on the seat.

In addition to one or more of the features described herein, the method may further include sensing weight on a seat in the seating area, wherein disabling deployment of the airbag is further based at least in part upon the sensed weight on the seat.

In addition to one or more of the features described herein, each of the segmentation model, the pose model and the height attribute model may include an offline trained neural network.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
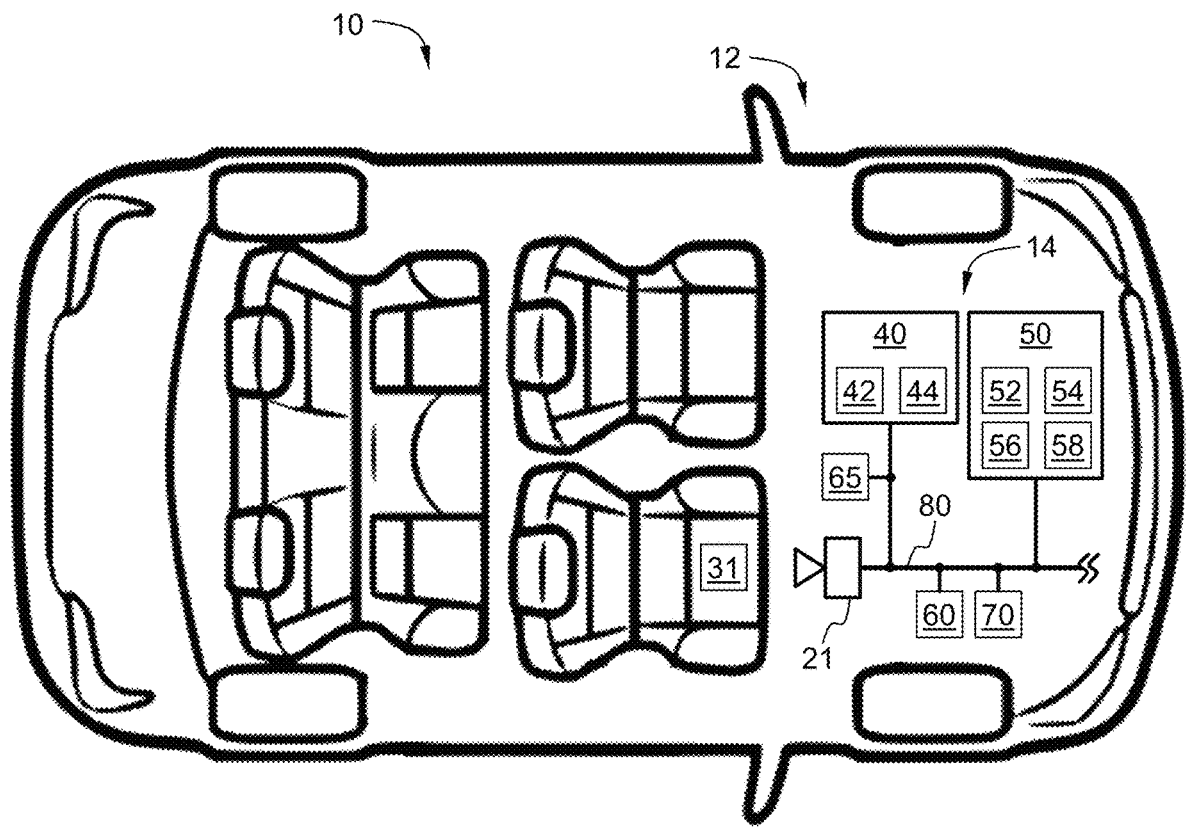
FIG. 1 illustrates an exemplary vehicle, in accordance with the present disclosure.

The following description is merely exemplary in nature and is not intended to limit the present disclosure, its application or uses. Throughout the drawings, corresponding reference numerals indicate like or corresponding parts and features.

Turning now to FIG. 1, an exemplary vehicle 10 may include a passenger inflatable restraint deployment enablement system 12 for carrying out the deployment enablement method described below. According to this example, system 12 includes vehicle hardware 14 that has a vehicle camera 21, a vehicle data processing module 40, a vehicle communications module 50, a vehicle autonomous driving module 60, an inflatable restraint (airbag) sensing and diagnostic module (SDM) 65, other vehicle electronic modules 70, as well as any other suitable combination of systems, modules, devices, components, hardware, software, etc. that are needed to carry out the method, steps and/or functionality described herein. The various components of the vehicle hardware 14 may be connected by a vehicle communication network 80 (e.g., a wired vehicle communications bus, a wireless vehicle communications network, or some other suitable communications network). Vehicle 10 may be a traditional non-autonomous vehicle or an autonomous or semi-autonomous vehicle. The phrase "autonomous or semi-autonomous vehicles," as well as any derivative terms, broadly means any vehicle capable of automatically performing a driving-related action or function, without a driver request, and includes actions falling within levels 1-5 of the Society of Automotive Engineers (SAE) International classification system.

One having ordinary skill in the art will appreciate that the schematic block diagram of the vehicle hardware 14 is simply meant to illustrate some of the more relevant hardware components used with the present method and it is not meant to be an exact or exhaustive representation of the vehicle hardware that would typically be found on such a vehicle. Furthermore, the structure or architecture of the vehicle hardware 14 may vary substantially from that illustrated in FIG. 1 (e.g., modules 40-70 could be integrated or otherwise combined with one another or with other equipment, as opposed to all being separate, stand-alone components). Because of the countless number of potential arrangements and for the sake of brevity and clarity, the vehicle hardware 14 is described in conjunction with the illustrated embodiment of FIG. 1, but it should be appreciated that the present system and method are not limited to such.

Vehicle camera 21 is mounted inside of the vehicle cabin and provides the present system and method with camera image data. Although the following examples describe the vehicle camera 21 in the context of video cameras that generate corresponding images or still frames, camera 21 may include any suitable camera or vision system known or used in the industry, so long as it is capable of gathering images, representations and/or other information regarding the environment inside of the vehicle cabin. Depending on the particular application, camera 21 may include: a still camera, a video camera; a BW and/or a color camera; an analog and/or digital camera; a wide and/or narrow field-of-view (FOV) camera; and may be part of a mono and/or stereo system, to cite a few possibilities. According to a non-limiting example, the vehicle hardware 14 includes camera 21 that is a passenger-facing CMOS video camera and provides camera image data to the rest of system 12, including the vehicle data processing module 40, via the vehicle communications network 80. Camera 21 may be a wide-angle camera (e.g., with a FOV of about 170° or more) so that a full view or nearly full view of the relevant seating area may be obtained. The camera image data outputted by camera 21 may include raw video or still image data (i.e., with no or little pre-processing), or it may include pre-processed video or still image data in cases where the camera has its own image processing resources and performs pre-processing on the captured images before outputting them as camera image data.

Vehicle camera 21 may be arranged or set up in the vehicle cabin according to any number of different configurations. For instance, camera 21 may be mounted in the vehicle roof or headliner at a central position located between driver-side and passenger-side seats. In this configuration, camera 21 could be installed in a rear-view mirror assembly, in an infotainment unit or the like, or mounted in other centrally located positions. On the other hand, the present system may have camera 21 mounted in the vehicle cabin at side positions closer to the vehicle's A-pillar or B-pillar. Other configurations, including ones with additional cameras and different mounting locations may be employed.

Seat weight sensor 31 may be mounted within the front passenger seating area, particularly the lower horizontal portions thereof. When the passenger seat is occupied by a passenger the seat weight sensor will indicate whether the passenger exceeds a calibrated weight, as is widely known and understood in the art. The exact format or structure of the seat weight sensor 31 may vary and is not limited to any particular embodiment.

Vehicle data processing module 40, vehicle communications module 50, vehicle autonomous driving module 60, SDM 65, as well as the other vehicle electronic modules 70 may include any suitable components and be arranged according to any suitable configurations known or used in the industry. Because the particular architectures of modules 40-70 are not critical and because these modules can be provided according to so many different embodiments, the following description of components of module 40 can apply to any of the modules 40-70, except for where stated otherwise. For instance, each of the modules 40-70 may include one or more processing device(s) 42, memory device(s) 44, I/O device(s), as well as any other hardware and/or software typically found on such modules. The processing device 42 can be any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. It can be a dedicated processor used only for module 40 or can be shared with other vehicle systems, modules, devices, components, etc. The processing device 42 can execute various types of electronic instructions, such as software and/or firmware programs stored in the memory device 44, which enable the module 40 to carry out various functionality. The memory device 44 can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. In one example, the processing device 42 executes programs or processes data and the memory device 44 stores programs or other data in order to help carry out or support at least a part of the present method.

Vehicle data processing module 40 receives camera image data from camera 21 and weight data from seat weight sensor 31, and may be configured to evaluate, analyze and/or otherwise process these inputs before air bag deployment determination information, as explained below. Vehicle data processing module 40 may be indirectly or directly connected to the vehicle camera 21 and the seat weight sensor 31, as well as any combination of the other modules 50-70 (e.g., via vehicle communications network 80). It is possible for the vehicle data processing module 40 to be integrated or combined with the vehicle camera 21 and/or the seat weight sensor 31 so that they are part of a single packaged module or unit, or it is possible for the module 40 to be combined with any number of other systems, modules, devices and/or components in the vehicle.

Vehicle communications module 50 provides the vehicle with short range and/or long range wireless communication capabilities so that the vehicle can communicate and exchange data with various devices and systems, including other vehicles or a back-end or cloud-based facility used with autonomous or semi-autonomous vehicles, for example. For instance, vehicle communications module 50 may include a short range wireless circuit that enables short range wireless communications (e.g., Bluetooth™, other IEEE 802.15 communications, Wi-Fi™ other IEEE 802.11 communications, vehicle-to-vehicle communications, etc.). Module 50 may also include a cellular chipset and/or a vehicle telematics unit that enables long range wireless communications with a back-end facility or other remotely located entity (e.g., cellular, telematics communications, etc.). According to one non-limiting example, the vehicle communications module 50 includes processing and memory devices 52, 54, similar to those mentioned above, a short range wireless circuit 56, a long range wireless circuit 58 in the form of a cellular chipset, and one or more antenna(s). Vehicle communications module 50 may be indirectly or directly connected to the vehicle camera 21 and seat weight sensor 31, as well as any combination of the other modules 40, 60, 65, 70 (e.g., via vehicle communications network 80). It is possible for the module 50 to be combined with any number of other systems, modules, devices and/or components in the vehicle.

Vehicle autonomous driving module 60 may provide the vehicle with autonomous and/or semi-autonomous driving capabilities and, depending on the particular embodiment, may be a single module or unit or a combination of modules or units. The particular arrangement, configuration and/or architecture of the vehicle autonomous driving module 60 is not imperative, so long as the module helps enable the vehicle to carry out autonomous and/or semi-autonomous driving functions. Vehicle autonomous driving module 60 may be indirectly or directly connected to the vehicle camera 21 and seat weight sensor 31, as well as any combination of the other modules 40, 50, 70 (e.g., via vehicle communications network 80). It is possible for the module 60 to be combined with any number of other systems, modules, devices and/or components in the vehicle or, in the alternative, for module 60 to be omitted altogether.

SDM 65 may perform functions related to inflatable restraint systems on the vehicle. SDM 65 may receive and process signals from inertial sensors measuring crash severity and, in some systems, direction. SDM 65 may store certain vehicle information for a period of time prior to a crash event. SDM 65 may provide deployment signals to the various airbags of the vehicle causing airbag inflation. Airbag deployment signals may be suppressed to various ones of the airbags throughout the vehicle by the SDM 65 in accordance with control algorithms. Conventionally, seat weight sensor 31 in a front passenger seat may provide a signal to the SDM either directly or via, for example, a body control module or other controller needed for passenger airbag(s) deployment decisions by the SDM. For example, unless the passenger indicates a predetermined weight at the seat weight sensor 31, the deployment may be suppressed.

Vehicle electronic modules 70 may include any other suitable modules needed to help implement the present method. For instance, module 70 may include any combination of an infotainment module, a powertrain control module (PCM), an engine control module (ECM), a transmission control module (TCM), a body control module (BCM), a traction control or stability control module, a cruise control module, a steering control module, a brake control module, etc. As with the previous modules, vehicle electronic module 70 may be indirectly or directly connected to the vehicle camera 21 and seat weight sensor 31, as well as any combination of the other modules 40, 50, 60, 65 (e.g., via vehicle communications network 80). It is possible for the module 70 to be combined with any number of other systems, modules, devices and/or components in the vehicle.

Figure 2:
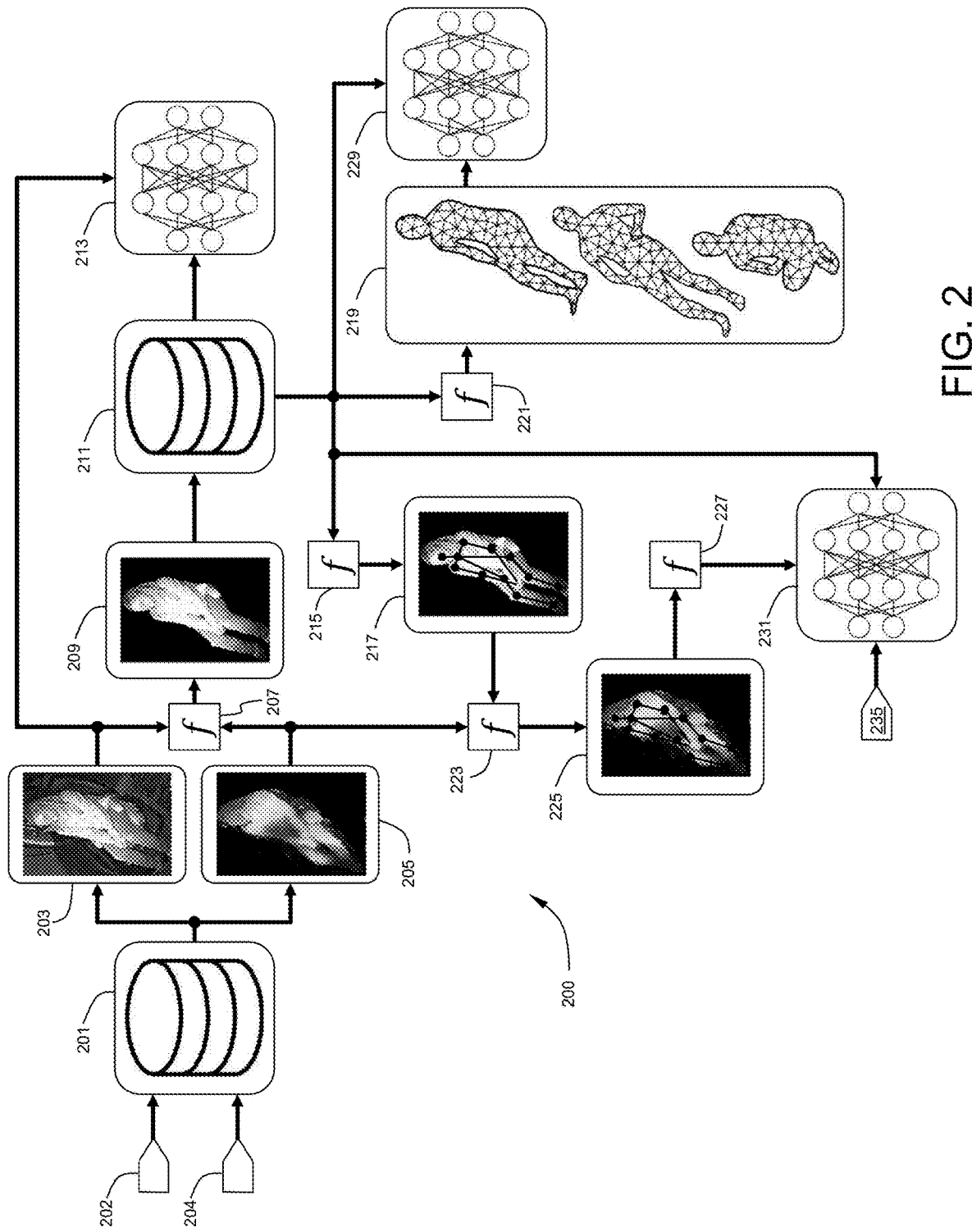
FIG. 2 illustrates an offline training environment, in accordance with the present disclosure.

In accordance with the present disclosure, determining the propriety of enabling the deployment of a passenger inflatable restraint may include on-line image processing by classifiers that are trained in an offline environment. In one embodiment, and with reference to FIG. 2, the offline training environment 200 may include a two-dimensional (2D) camera 202 and a three-dimensional (3D) camera 204. 2D camera 202 may be any suitable variety for providing image data such as, for example, a conventional RGB CMOS or CCD camera. One having ordinary skill in the art will understand that image resolution is critical at a cropped image level on the lower end for fidelity of the image and at the upper end relative to data throughput in offline training and online application processing. In one embodiment, a final cropped image resolution of about 300×300 pixels provides a satisfactory balance. Other resolutions are within the scope of the disclosure and the present example is by way of illustration only and not limitation or necessity. The 3D camera 204 may be any suitable variety for providing a depth map image by triangulation or time-of-flight using known CCD or CMOS technologies, for example. 3D camera 204 may be a single or stereoscopic imaging device and associated processing to provide a depth map image. One use objective of the 2D camera 202 and 3D camera 204 is to provide image correspondence of the 3D image to the 2D image plane. Therefore, as 2D and 3D images are referenced herein, it is assumed that the 3D image is mapped to the 2D image in 2D spatial conformance. Thus, it is appreciated that ideally the points of view of the 2D camera 202 and the 3D camera 204 are identical. To the extent that the functions of the 2D camera 202 and the 3D camera 204 may be integrated into a single device, such configuration may be preferred. Otherwise 2D camera 202 and 3D camera 204 placement is as close as practical.

In the offline training process, the 2D camera 202 and the 3D camera 204 are configured to preferably provide time invariant images. That is to say, the images are captured at the same instant or so close in time as to approximate simultaneously captured images. Such simultaneously captured 2D and 3D images may be referred to as image pairs. This may be preferred particularly where the image subject may be prone to movement during the image capture session. Moreover, in the present embodiment, the 2D camera 202 and the 3D camera 204 are arranged in an actual vehicle passenger compartment and preferably at a position in space that corresponds as closely as practical to an on-vehicle application of image capturing as discussed herein. Alternatively, a mock-up environment as close as practical in geometric aspects to the on-vehicle application is desirable. Unless specifically stated otherwise herein, further references herein are with respect to an offline vehicle or mock-up. In the present embodiment, an offline arrangement corresponding, for example, to the exemplary on-vehicle configuration of the passenger inflatable restraint deployment enablement system 12 including vehicle camera 21 shown in FIG. 1 is preferred. In the present embodiment, images of a human subject seated in the passenger seat are captured. Many different images representing many different human subjects may be captured. Moreover, many different images representing many different seating positions, postures or poses may be captured. The image pairs are retained in training database 201 with the 2D and 3D images referentially indexed one to the other so that correspondence is assured. As part of the image capture process, the images may be cropped from their native resolution to a lesser resolution thus providing images that are more limited in field of view and particularly corresponding to the area of interest which is the seating area of the vehicle or mock-up. During the initial build of the training database 201, labeling or annotation of the images may be performed. For example, certain ground truths such as subject seated height and weight may be manually associated with the images. Seated height means the height of a seated subject from the horizontal seating surface to the top of the subject's head.

In one embodiment, training database 201 provides image pairs of 2D images 203 and 3D images 205 for segmentation 207 of the background of 2D image 203 wherein the human subject and background are readily distinguished from the 3D image 205 depth map and the background suppressed. After segmentation 207, segmented 2D images 209 are output and provided to training database 211. Training database 211 may be independent from training database 201. Alternatively, training database 211 may be part of training database 201. Regardless, segmented 2D images 209 may be referentially indexed to the respective image pairs of 2D images 203 and 3D images 205 utilized in the segmentation 207. A segmentation model 213 may then be trained based upon the segmented 2D images 209 from training database 211 and the ground truth provided by the 2D images 203. Segmentation model 213 may be any appropriate machine learning algorithm such as a deep neural network, for example. Trained segmentation model 213 may be used in an online method to perform background segmentation of 2D images as described herein.

In one embodiment, training database 211 provides segmented 2D images 209 for 3D mesh reconstruction 221. After 3D mesh reconstruction, mesh poses 219 are output and may be provided to a training database such as training database 211 or 201. Mesh poses may, for example, include such posture attributes as normal, leaning (left or right), slouching, crossed legs, legs to chest, crossed legs, extended arms, etc. Mesh poses 219 may be referentially indexed to segmented 2D images 209 utilized in the mesh reconstruction 221 and/or the related respective image pairs of 2D images 203 and 3D images 205. A pose model 229 may then be trained based upon the segmented 2D images 209 and the mesh poses 219 providing a ground truth for extracting subject poses from segmented 2D images 209. Pose model 229 may be any appropriate machine learning algorithm such as a deep neural network, for example. Trained pose model 229 may be used in an online method to perform pose extraction from 2D images as described herein.

In one embodiment, training database 211 provides segmented 2D images 209 for 2D skeleton extraction 215. After 2D skeleton extraction, 2D skeletons 217 are output and may be provided to a training database such as training database 211 or 201. 2D skeletons 217 may be referentially indexed to segmented 2D images 209 utilized in the 2D skeleton extraction 215 and/or the related respective image pairs of 2D images 203 and 3D images 205. 2D skeletons 217 may then be projected 223 upon 3D images 205 to produce 3D skeletons 225 for seated height extraction 227. A subject height and weight attribute model 231 may then be trained based upon the segmented 2D images 209, the seated height extraction 227, and subject weight 235 which may be image annotated data, for example. It is appreciated that the height and weight attribute model 231 provides fusion of image data and weight data. Height and weight attribute model 231 may be any appropriate machine learning algorithm such as a deep neural network, for example. Height and weight attribute model 231 may be used in an online method to perform seated height and weight extraction from 2D images as described herein. Alternatively, a more limited height model may be trained ignoring weight and based upon the segmented 2D images 209 and the seated height extraction 227, for example.

Figure 3:
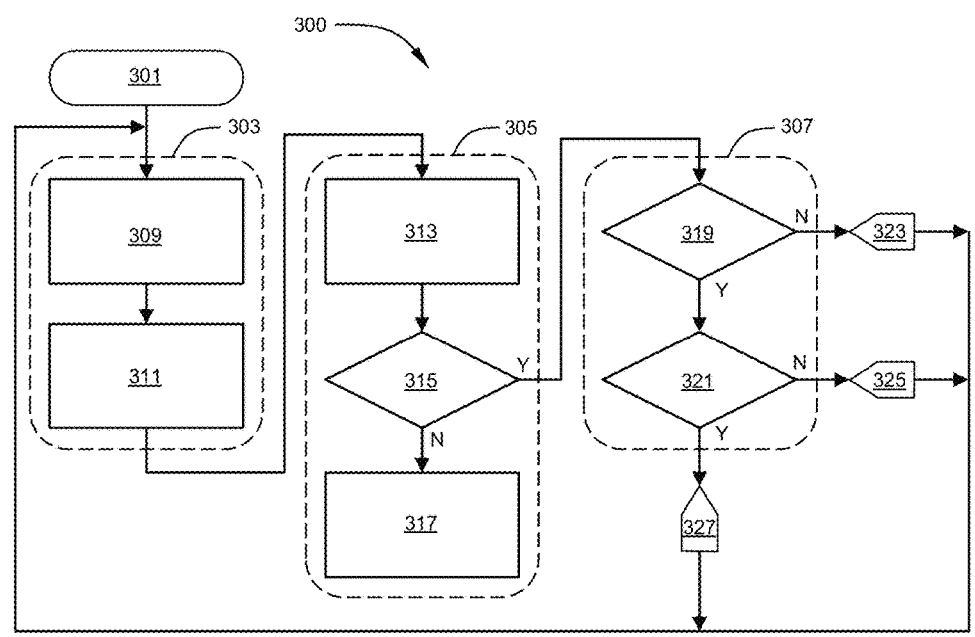
FIG. 3 illustrates an exemplary method, in accordance with the present disclosure.

FIG. 3 illustrates an online method 300 for determining the propriety of enabling the deployment of a passenger inflatable restraint including application of the models trained in an offline environment as described herein. In one embodiment the online environment, including hardware implementation, may be substantially in accordance with the exemplary vehicle hardware 14 of FIG. 1. Method 300 may include a first stage 303 including segmentation model 213, a second stage 305 including pose model 229 and a third stage 307 including height and weight attribute model 231 all as trained offline as set forth herein above.

Method 300 initiates at 301 entering first stage 303 where 2D images of the passenger seating area are captured by vehicle camera 21 at block 309. Image capture may be performed on a regular basis during vehicle operation including in a substantially continuous manner where vehicle camera provides a video feed at a predetermined frame rate and 2D images may be individual frames from a video stream. Image preprocessing may be performed at block 309 including, for example, image cropping from native vehicle camera 21 resolution to a desired resolution and region, for example 300 by 300 pixels. Background segmentation may occur at block 311 including through use of segmentation model 213 whereby superfluous image background information is suppressed and a segmented 2D image is produced.

The second stage 305 of the method 300 receives the segmented 2D images from the first stage 303 at block 313. Block 313 may include pose model 229 whereat the segmented 2D image may be classified as one of a plurality of poses representative of the posture of the occupant of the seating area. In one embodiment, pose model 229 may also classify the 2D image as a rear facing child restraint system (CRS), empty seat, cargo, undefined, etc. The classification from pose model 229 may pass to decision block 315 whereat determinations are made relative to the classification. For example, where the pose model 229 provides a classification of the segmented two-dimensional image as a passenger with an acceptable pose or posture for inflatable restraint deployment or acceptable for further processing requirements, execution of the method 300 may continue at the third stage 307. However, where the pose model 229 provides a classification of the segmented two-dimensional image other than a passenger (e.g. rear facing CRS, cargo) or a passenger in an unacceptable pose or posture, execution of the method 300 may continue at block 317 whereat appropriate responses to such classification may be invoked. For example, block 317 may simply disable deployment of some or all inflatable restraints associated with the passenger seating area by providing appropriate information (e.g. deployment flag(s)) to the SDM 65, or may provide notification of an out of position occupant and disablement of the corresponding inflatable restrains until a correct seating position is assumed. Other notifications and actions may be apparent to one having ordinary skill in the art. From block 317 the method 300 may continue back at block 309 beginning the process over again.

The third stage 307 of the method 300 may employ the height and weight attribute model 231 whereat the segmented 2D image and the weight sensor 31 may provide input thereto. The height and weight attribute model 231 may pass a seated height and weight of the passenger to decision blocks 319 and 321 whereat determinations are made relative to the seated height and weight of the passenger whether to enable deployment of the inflatable restraints corresponding to the passenger seating area. Alternatively, a simplified weight attribute model may pass just seated height of the passenger to decision blocks 319 and 321 whereat determinations are made based at least in part on the seated height of the passenger whether to enable deployment of the inflatable restraints corresponding to the passenger seating area. For example, where the passenger seated height returned by the height and weight attribute model 231 is less than a predetermined height, decision block 319 may set a do not deploy flag 323. Otherwise, where the passenger seated height returned by the height and weight attribute model 231 is not less than the predetermined height, decision block 319 may exit to decision block 321 for further evaluation of passenger weight. Where the weight of the passenger returned by the height and weight attribute model 231 is less than a predetermined weight, decision block 321 may set a do not deploy flag 325. Otherwise, where the passenger weight returned by the height and weight attribute model 231 is not less than the predetermined height, decision block 321 may set a deploy flag 327. The flags 323, 325, 327 may provide information to SDM 65 for enabling or disabling deployment of some or all or the airbags corresponding to the passenger seating area in the event of a crash. Subsequent to each flag setting 323, 325, 327, the method 300 may continue back at block 309 beginning the process over again.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An apparatus, comprising:
a camera providing a two-dimensional image of a seating area of a vehicle;
a controller using a height attribute model to determine a seated height of a seated passenger in the seating area of the vehicle appearing in the two-dimensional image, the height attribute model having been trained on seated height extraction from three-dimensional skeletons training produced by projecting two-dimensional skeletons upon three-dimensional training images, wherein the two-dimensional skeletons are extracted from segmented two-dimensional training images; and
a controller enabling deployment of an airbag based upon the determined seated height of the seated passenger.

2. The apparatus of claim 1, further comprising a seat weight sensor providing a sensed weight of the seated passenger, wherein the height attribute module further comprises fusion of the sensed weight of the seated passenger.

3. The apparatus of claim 1, wherein the controller further uses a pose model to determine a pose of the seated passenger in the seating area of the vehicle appearing in the two-dimensional image, the pose model having been trained on mesh poses reconstructed from the segmented two-dimensional training images.

4. The apparatus of claim 1, wherein the controller further uses a segmentation model performing background segmentation of the two-dimensional images to provide segmented two-dimensional images to the height attribute model, the segmentation model having been trained on the segmented two-dimensional training images, wherein the segmented two-dimensional training images are produced based upon pairs of simultaneously captured two-dimensional and three-dimensional training images.

5. The apparatus of claim 3, wherein the controller further uses a segmentation model performing background segmentation of the two-dimensional images to provide segmented two-dimensional images to the height attribute model and the pose model, the segmentation model having been trained on the segmented two-dimensional training images, wherein the segmented two-dimensional training images are produced based upon pairs of simultaneously captured two-dimensional and three-dimensional training images.

6. The apparatus of claim 2, wherein the controller enabling deployment of an airbag based upon the determined seated height of the seated passenger further enables deployment of the airbag based upon the seated passenger weight.

7. An apparatus, comprising:
a camera providing a two-dimensional image of a seating area of a vehicle;
a seat weight sensor providing a sensed weight on a seat in the seating area;
a controller comprising:
a segmentation model performing background segmentation of the two-dimensional image to provide a segmented two-dimensional image of a seated passenger in the seating area of the vehicle appearing in the two-dimensional image;
a pose model determining a pose of the seated passenger in the seating area of the vehicle based upon the segmented two-dimensional image;
a height and weight attribute model determining a seated height and a weight of the seated passenger in the seating area of the vehicle based upon the segmented two-dimensional image and the sensed weight of the seated passenger; and
a controller enabling deployment of an airbag based upon the determined seated height and weight of the seated passenger;
wherein each of the segmentation model, the pose model and the height and weight attribute model comprises an offline trained machine learning model.

8. The apparatus of claim 7, wherein the machine learning models comprise neural networks.

9. An apparatus, comprising:
a camera providing a two-dimensional image of a seating area of a vehicle;
a seat weight sensor providing a sensed weight on a seat in the seating area;
a controller comprising:
a segmentation model performing background segmentation of the two-dimensional image to provide a segmented two-dimensional image of a seated passenger in the seating area of the vehicle appearing in the two-dimensional image;
a pose model determining a pose of the seated passenger in the seating area of the vehicle based upon the segmented two-dimensional image;
a height and weight attribute model determining a seated height and a weight of the seated passenger in the seating area of the vehicle based upon the segmented two-dimensional image and the sensed weight of the seated passenger; and
a controller enabling deployment of an airbag based upon the determined seated height and weight of the seated passenger;
wherein the segmentation model comprises a neural network trained on a training database of segmented two-dimensional training images, wherein the segmented two-dimensional training images are produced based upon pairs of simultaneously captured two-dimensional and three-dimensional training images.

10. An apparatus, comprising:
a camera providing a two-dimensional image of a seating area of a vehicle;
a seat weight sensor providing a sensed weight on a seat in the seating area;
a controller comprising:
a segmentation model performing background segmentation of the two-dimensional image to provide a segmented two-dimensional image of a seated passenger in the seating area of the vehicle appearing in the two-dimensional image;
a pose model determining a pose of the seated passenger in the seating area of the vehicle based upon the segmented two-dimensional image;
a height and weight attribute model determining a seated height and a weight of the seated passenger in the seating area of the vehicle based upon the segmented two-dimensional image and the sensed weight of the seated passenger; and
a controller enabling deployment of an airbag based upon the determined seated height and weight of the seated passenger;
wherein the pose model comprises a neural network trained on a training database of segmented two-dimensional training images, wherein the segmented two-dimensional training images are produced based upon pairs of simultaneously captured two-dimensional and three-dimensional training images.

11. An apparatus, comprising:
a camera providing a two-dimensional image of a seating area of a vehicle;
a seat weight sensor providing a sensed weight on a seat in the seating area;
a controller comprising:
  a segmentation model performing background segmentation of the two-dimensional image to provide a segmented two-dimensional image of a seated passenger in the seating area of the vehicle appearing in the two-dimensional image;
  a pose model determining a pose of the seated passenger in the seating area of the vehicle based upon the segmented two-dimensional image;
  a height and weight attribute model determining a seated height and a weight of the seated passenger in the seating area of the vehicle based upon the segmented two-dimensional image and the sensed weight of the seated passenger; and
a controller enabling deployment of an airbag based upon the determined seated height and weight of the seated passenger;
wherein the height and weight attribute model comprises a neural network trained on three-dimensional skeletons corresponding to a training database of segmented two-dimensional training images, wherein the segmented two-dimensional training images are produced based upon pairs of simultaneously captured two-dimensional and three-dimensional training images.

12. The apparatus of claim 11, wherein the segmented two-dimensional training images are subjected to a two-dimensional skeleton extraction to produce two-dimensional skeletons projected upon three-dimensional training images corresponding to the segmented two-dimensional training images to produce the three-dimensional skeletons.

13. A method, comprising:
capturing a two-dimensional image of a seating area of a vehicle;
segmenting, with a segmentation model, the two-dimensional image to provide a segmented two-dimensional image;
classifying, with a pose model, the segmented two-dimensional image as one of a passenger with an acceptable pose and not a passenger with an acceptable pose;
determining, with a height attribute model, a seated height of the passenger with an acceptable pose based upon the segmented two-dimensional image; and
enabling deployment of an airbag based at least in part upon the determined seated height of the passenger with an acceptable pose meeting predetermined height requirements.

14. The method of claim 13, further comprising disabling deployment of the airbag based at least in part upon the determined seated height of the passenger with an acceptable pose failing predetermined height requirements.

15. The method of claim 13, further comprising disabling deployment of the airbag based upon the segmented two-dimensional image classifying as not a passenger with an acceptable pose.

16. The method of claim 13, further comprising sensing weight on a seat in the seating area, wherein enabling deployment of the airbag is further based at least in part upon the sensed weight on the seat.

17. The method of claim 14, further comprising sensing weight on a seat in the seating area, wherein disabling deployment of the airbag is further based at least in part upon the sensed weight on the seat.

18. The method of claim 13, wherein each of the segmentation model, the pose model and the height attribute model comprises an offline trained neural network.

* * * * *